INVENTORS
RICHARD H. KROCK
EDWARD J. ZDANUK
YUAN SHOU SHEN
BY
ATTORNEY

INVENTORS
RICHARD H. KROCK
EDWARD J. ZDANUK
YUAN SHOU SHEN
BY
Henry W. Cummings
ATTORNEY

INVENTORS
RICHARD H. KROCK
EDWARD J. ZDANUK
YUAN SHOU SHEN

BY Henry W. Cummings
ATTORNEY

United States Patent Office
3,694,197
Patented Sept. 26, 1972

3,694,197
ELECTRICAL CONTACT MATERIALS OF SILVER-CADMIUM OXIDE CONTAINING ADDITIVES
Edward J. Zdanuk, Burlington, Richard H. Krock, Weston, and Yuan Shou Shen, Reading, Mass., assignors to P. R. Mallory & Co. Inc., Indianapolis, Ind.
Filed Nov. 12, 1970, Ser. No. 88,620
Int. Cl. C22c 5/00
U.S. Cl. 75—173 R   44 Claims

ABSTRACT OF THE DISCLOSURE

Improved properties including reduced arc erosion rate are obtained in silver-cadmium oxide alloys by adding at least one additive selected from the group consisting of beryllium, cerium, scandium, antimonyl, gallium, indium, strontium, yttrium and thallium metals in an amount from 0.001 up to 5%, and optionally tin.

BACKGROUND

Up to the present time one of the most commercial electrical contact material is silver-cadmium oxide in accordance with the teachings of U.S. Patent 2,539,298, issued July 28, 1945 to Arnold S. Doty, However, the arc erosion rate of this material is not as low as desired. It is desirable that the electrical conductivity of the material not be substantially reduced in an effort to reduce the arc erosion rate. Furthermore, it is desirable to discover new benefits in the properties of silver-cadmium alloys with a view to obtaining new applications for this material.

OBJECTS

It therefore is a first object of the present invention to reduce the arc erosion rate of silver-cadmium oxide electrical contact material.

It is another object of the present invention to reduce the erosion rates without substantially reducing the electrical conductivity of the material.

Another object of the present invention is to increase the rate of internal oxidation of the cadmium so that lower processing times are required.

Another object of the present invention is to produce a finer silver-cadmium oxide microstructure.

Another object of the present invention is to prevent oxide precipitation along the grain boundaries which embrittle the silver matrix.

Other objects will be apparent from the following description and drawings.

DRAWINGS

SUMMARY OF THE INVENTION

The present invention involves addition to silver-cadmium alloys of at least one of the following additives in an amount of from 0.001% up to about 5% of gallium, indium, thallium, beryllium, antimony and scandium Strontium, yttrium and cerium containing alloys such as mish-metal with Ce may be used. The additions may be made alone or in combination with each other. Tin in the range of 0.001% to about 5% is a particularly effective second addition. Often only a single addition is necessary to obtain improved properties, but the addition of two or more additives is often useful in particular applications.

DETAILED DESCRIPTION

The cadmium content of the alloys of the present invention can vary from about 1 up to about 30% by weight cadmium. The effect of increased amounts of cadmium is shown in the following table.

Preferably cadmium is present up to 25% by weight and most preferably up to 15% by weight.

TABLE I
Effects of Cd on the properties of silver

| Material w/o Ag | W/o CdO | V/o CdO | Percent IACS | Electrical conductivity, percent of Ag |
|---|---|---|---|---|
| 100 | 0 | 0 | 108 | 100 |
| 90 | 10 | 12.6 | 75 | 69 |
| 85 | 15 | 18.6 | 65 | 60 |
| 80 w/o Ag | 20 | 23 | 55 | 50 |

Considering now the additives one by one, a particularly effective additive is beryllium. When beryllium is used alone it should preferably be in an amount of 0.001 to about 0.5% by weight most preferably from 0.01% to 0.3% by weight. Cadmium is preferably not more than about 20%. One effect of beryllium is to decrease the cadmium oxide particle size. Compare FIG. 2A (containing beryllium) with FIG. 1 (without beryllium). This not only results in a stronger material, but also in a material having a finer microstructure than alloys not having a beryllium addition. This is shown more clearly in FIG. 2B. In generally, the arc erosion rate of beryllium containing alloys is below 1.5 milligrams per kilocycle of operation and is often as low as 1.40 milligrams per kilocycle and lower compared to about 1.7 milligrams per kilocycle for material without beryllium addition.

Figure 9:
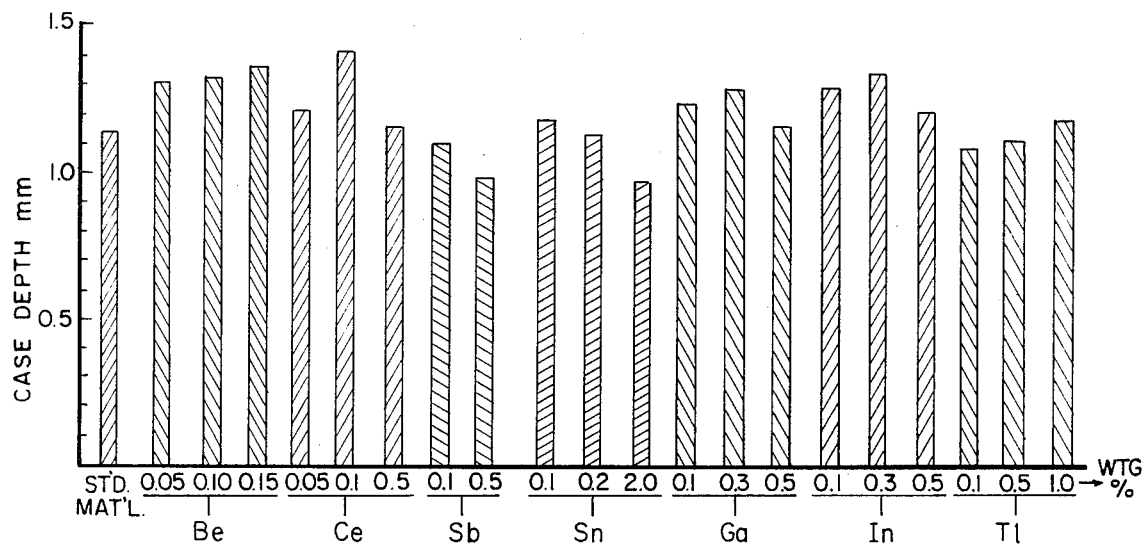
FIG. 9 is a view of plot of case depth against additive amounts for the silver-cadmium alloys of the present invention.

A particularly interesting advantage of a beryllium addition is that it increases the rate of internal oxidation of the basic silver-cadmium alloy. Thus, either lower temperature and/or less time at the same temperature may be utilized for internal oxidation with beryllium additives. The reduction in treatment time is suggested in FIG. 9.

Figure 3:
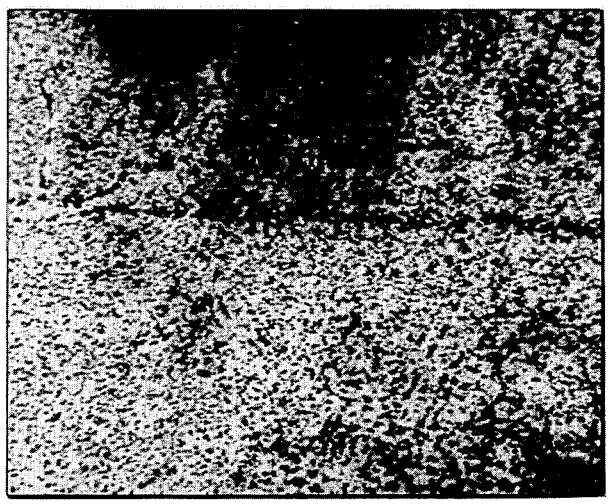
FIG. 3 is a view of the microstructure of a 0.1% by weight cerium containing silver-9% cadmium oxide material at 545×.

Other additives which may be utilized are cerium, scandium, strontium, and yttrium the range of about 0.001% to about 5%. Cerium, yttrium and strontium may be used alone or as an alloy such as mish-metal with Ce preferably from 0.01% to 2%. Scandium either alone or as an alloy in an amount of about 0.01 to 1.5% by weight may be used. Cadmium is preferably not more than 25%. The microstructure for a cerium additive (0.1%) is shown in FIG. 3. Cerium appears to be somewhat better than beryllium from the standpoint of arc erosion, generally below 1.30, usually below 1.25 mg. per kc. of operation. The arc erosion rate with scandium is from about 1.10 to 1.6 mg./kc., for yttrium 1.14 to 1.44 and strontium about 1.50 Yttrium, cerium and scandium appear to be somewhat effective regarding lower oxidation time and/or lower temperature of oxidation. See FIG. 9 for comparison with standard material for cerium.

Figure 4:
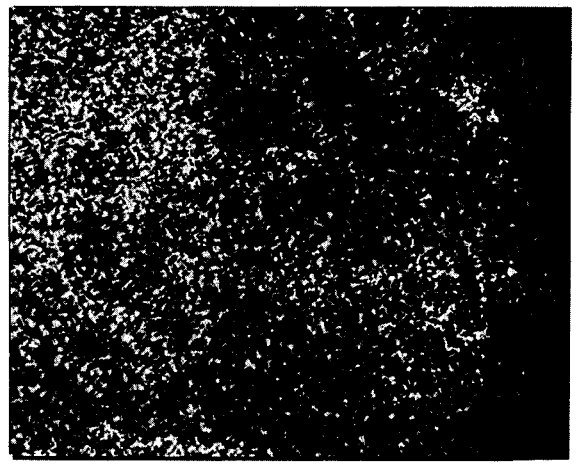
FIG. 4 is a view of the microstructure of a 0.05% by weight antimony containing silver-9% cadmium oxide material at 545×.

Another additive which may be utilized to obtain lower arc erosion rate is antimony. Antimony is preferably used in an amount of from 0.001% to about 0.7%; most preferably, the antimony content should be from 0.01% to 0.5%. Cadmium is preferably not above about 30% by weight. Antimony generally lowers the arc erosion rate to below about 1.5 milligrams per kilocycle. Furthermore, antimony additions tend to prevent oxide precipitation along the grain boundaries which usually embrittle the silver matrix as can be seen from FIG. 4.

Another additive which may be utilized in accordance with the present invention is indium. Indium is preferably in an amount of from 0.05 to 3%, most preferably, 0.1 to 2%. Cadmium is preferably not more than about 25%. Indium tends to prevent oxide precipitation on the grain boundary which as is indicated above tends to embrittle the silver matrix as can be seen from FIG. 5. Indium does not appear to greatly increase the rate of internal oxidation.

Figure 6:
FIG. 6 is a view of the microstructure of a 0.2% by weight gallium containing silver-9% cadmium oxide material at 545×.

Another additive which may be utilized in accordance with the present invention is gallium. Gallium should preferably be used in an amount from 0.001 to 0.5%, most preferably, from 0.01 to 0.3%. Cadmium should preferably not be above 25%. As can be seen from FIG. 6 the particle size is finer than in the sliver-cadmium oxide material without additives. The arc erosion rate is generally below 1.45 milligrams per kilocycle and is often below 1.4 milligrams and is often as low as 1.37 milligrams per kilocycle and lower. Gallium appears to somewhat increase the rate of internal oxidation.

Figure 7:
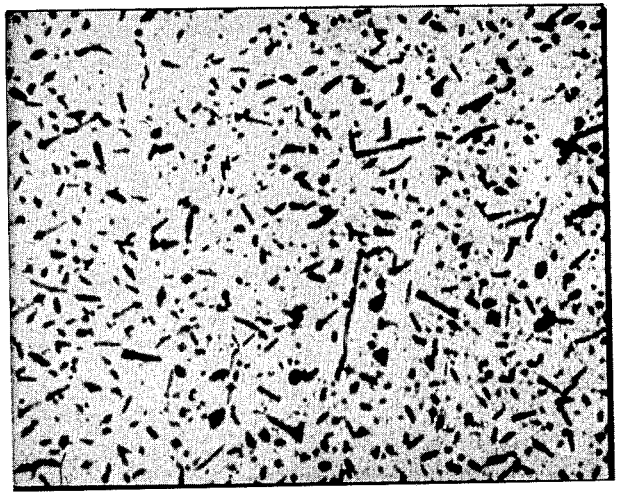
FIG. 7 is a view of the microstructure of a 0.5% by weight thallium containing silver-9% cadmium oxide material at 545×.

Another additive is thallium. Thallium should preferably be used in an amount of 0.005 to 2%, most preferably 0.01% to 1%. Cadmium should preferably not be above 25%. Thallium does not appear to greatly increase the rate of internal oxidation. The arc erosion rate with thallium is generally below 1.1 milligrams per kilocycle. Small amounts of thallium below 0.6% appear to give more reproducible results. The microstructure is shown in FIG. 7.

Figure 8:
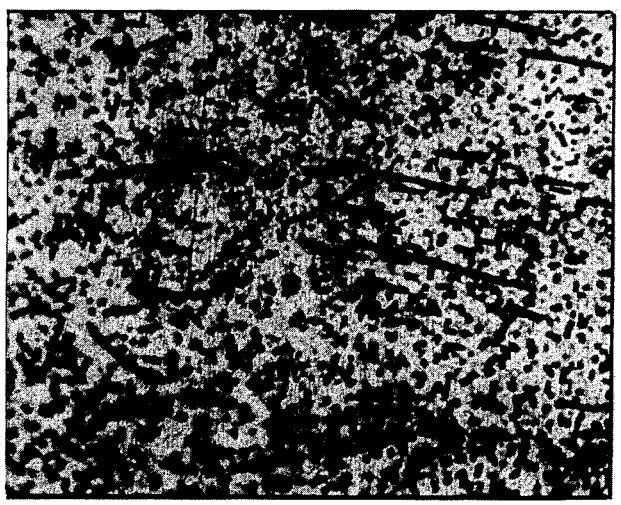
FIG. 8 is a view of the microstructure of a 0.1% by weight tin containing silver-9% cadmium oxide material at 545×.

As mentioned previously, combinations of additives may also be utilized. Two or more additives may be used, as desired, in order to obtain desired properties. Often, however, two additives are sufficient to obtain desired properties. Examples of such combinations are gallium and beryllium; and thallium and indium. However, a particularly effective additional additive which may be utilized in accordance with the present invention is tin. Tin is preferably utilized in the amount of about 0.05 to about 3%. Most preferably, the tin content is from 0.12 to about 2%. If tin is added, cadmium should preferably not be above about 25 weight percent. Furthermore, tin may partially substitute for cadmium up to about 5% tin. A tin addition tends to result in cadmium oxide precipitating in a spike-like-shape, as is indicated in FIG. 8. With a tin addition the arc erosion rate is generally below 1.4 mlligrams per kilocycle and is often as low as .136 and lower. Tin additions below about 0.5% show some tendency to increase the rate of internal oxidation.

Beryllium, which shows some reduction in erosion rate, imparts substantial increase in oxidation rate and substantial reduction in cadmium oxide particle size. Indium, which is associated with high oxidation rates and particle refinement, makes a logical partner with thallium which shows good reduction in arc erosion rate but little effect on oxidation rate of cadmium particle size. Combinations of additives can also be made on the basis of mechanical properties such as strength and/or ductility, in addition to reduction of arc erosion rate and increased oxidation rate.

Example I

Silver and 9% cadmium and 0.15% beryllium as additive were melted and cast to form an ingot. The ingot was then rolled to a slab of ⅛-inch of thickness. Slugs with the configuration of an electro-contact are punched from the slab in the form of ⅜″ diameter, right circular cylinders of height ⅛″.

These slugs are oxidized at 800° C. for 96 hours in air.

Figure 1:
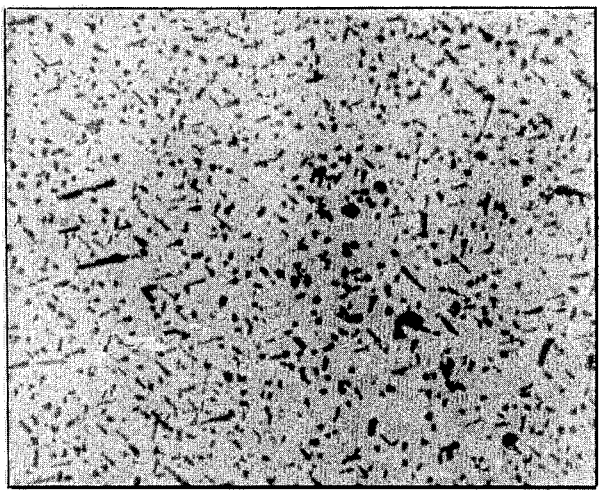
FIG. 1 is a view of the microstructure of a standard silver-9% cadmium oxide material without additives at 545×.
Figure 2A:
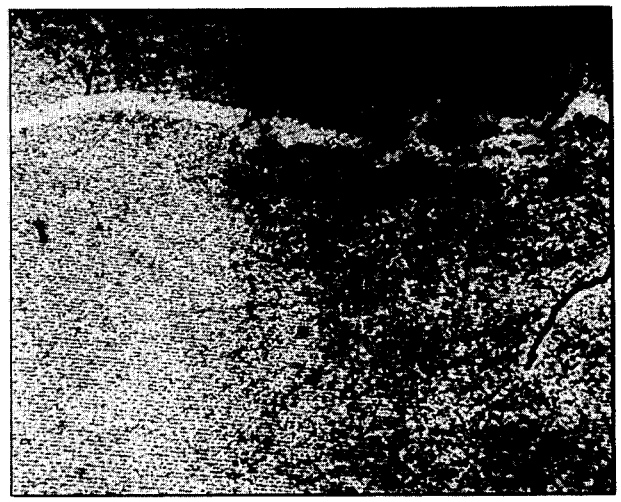
FIG. 2A is a view of the microstructure of a 0.15% by weight beryllium containing silver-9% cadmium oxide material at 545×.
Figure 2B:
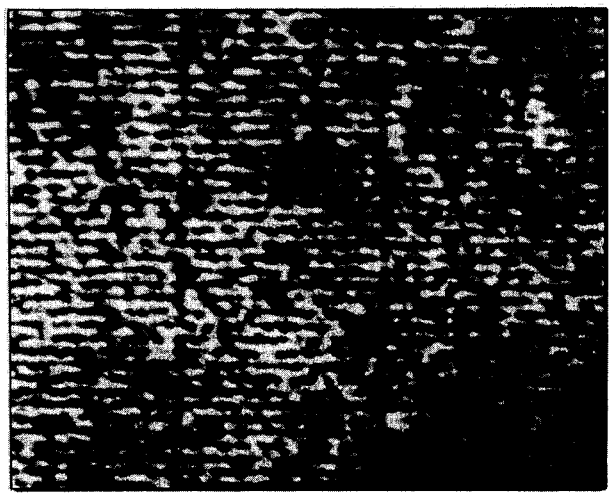
FIG. 2B is a view of the microstructure of a 0.15% by weight beryllium containing silver-9% cadmium oxide material at 1750×.

The microstructure of oxidized slug (as shown in FIG. 2A) revealed a much finer oxide particle than that of the straight Ag-CdO material (FIG. 1).

The material with beryllium additive was tested under the condition: 215 v., 150 a. A.C. with power factor of 45–55%, with duty cycle of ⅐ sec. on, ⁶⁄₇ sec. off, its arc erosion rate (weight loss) was 1.40 milligram per kilocycle of operation (mg./kc.), while the arc erosion rate of the straight Ag-CdO material tested under the same conditions was 1.65 mg./kc.

The case thickness of the contact made from the Ag-9 Cd-0.15 Be alloy after 96 hours oxidation at 800° C. was found to be 1.42 millimeter while the case thickness of straight Ag-9Cd alloy was found to be 1.14 mm. only.

On a volume percent basis for Ag-CdO bodies a limitation due to decreased electrical conductivity is to be expected and may be seen from Table II.

Additional results are found in Table II.

Example II

The same procedure as carried out in Example I was followed except 0.10% cerium was used instead of 0.15% beryllium.

The weight losses of contacts made from Ag-9Cd alloys with 0.10% cerium were 1.2 mg./kc.

The case depth of this alloy after oxidation under the above-mentioned condition was 1.418 mm.

The microstructure is shown in FIG. 3. Additional results are found in Table II.

Example III

Example I was repeated except 0.5% Sb was used instead of 0.15% Be.

The erosion rate of the contacts made from oxidized Ag-9Cd alloy with 0.5% Sb was 1.45 mg./kc. Antimony as additive in the alloy also tends to prevent the oxide precipitation along the grain boundary which would usually embrittle the silver matrix, as can be seen from FIG. 4. Additional data is shown in Table II.

TABLE II
Effect of additives on the Ag-CdO material

| Example No. | Alloy additive, percent | Estimate of relative average CdO particle size | Erosion rate, mg./kc. | Case depth, mm. at 96 hrs./800° C. | Conductivity, IACS percent |
|---|---|---|---|---|---|
| | Basic | 1.00 | 1.65 | 1.138 | 75 |
| I | Be, 0.15 | .25 | 1.40 | 1.321 | 65 |
| II | Ce, 0.1 | .75 | 1.21 | 1.418 | 70 |
| III | Sb, 0.5 | .50 | 1.48 | 0.982 | 75 |

Example IV

Silver and 9% cadmium and the amounts of indium as additive in Table III were melted and cast to the form of ingot. The ingot was then rolled to a slab of ⅛ inch of thickness. Slugs with the configuration of the electrical contact were punched from the slab in the same shape as Example I.

Figure 5:
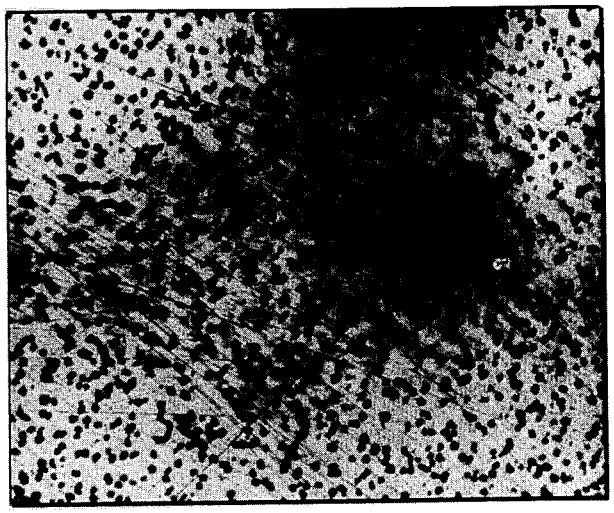
FIG. 5 is a view of the microstructure of a 0.02% by weight indium containing silver-9% cadmium oxide material at 545×.

These slugs were oxidized at 800° C. for 96 hours in air. The microstructure of the oxidized slug (as shown in FIG. 5) displayed somewhat finer particle than that of the straight Ag-CdO material (FIG. 1). When the material with 0.2% indium additive was tested under the condition 215 v., 150 A.C. with a power factor of 45–55%, with duty cycle the same as Example I, its arc erosion rate (weight loss was about 1.2 milligrams per kilocycle of operation mg./kc.), while the arc erosion rate of the straight Ag-CdO material tested under the same condition was 1.65 mg.kc.

Additional results are shown in Table III.

TABLE III
Effect of additives on the Ag-CdO materials

| Example No. | Alloy additives | Estimate of relative average Ag-CdO particle | Erosion rate, mg./kc. | Case depth, mm. at 96 hr./800° C. | Conductivity, IACS percent |
|---|---|---|---|---|---|
| | Basic (None) | 1.0 | 1.65 | 1.138 | 75 |
| IV | (a) In 0.2 | 0.5 | 1.10 | 1.198 | 85 |
| | (b) 0.1 | 0.5 | 1.57 | 1.119 | 84 |

Example V

Silver and 9% cadmium and the amounts of gallium shown in Table IV as addtive were melted and cast to the form of an ingot. The ingot was then rolled to a slab of ⅛ inch of thickness. Slugs with the configuration of the electrical contact are punched from the slab in the same shape as Example I.

These slugs were oxidized at 800° C. for 96 hours in air.

The microstructure of the oxidized slug (as shown in FIG. 7) displayed finer particles than that of the straight Ag-CdO material (FIG. 1).

When the material with 0.1% additive are tested under the condition 215 v., 150 a. alternating with power factor of 45–55%, duty cycle as in Examyle I, its arc erosion rate (weight loss) is 1.37 milligrams per kilocycle of operation (mg./kc.), while the arc erosion rate of the straight Ag-CdO material tested under the same condition was 1.65 mg./kc. (Table IV).

Additional results are shown in Table IV.

Example VI

Example VI is repeated using the amounts of thallium shown in Table IV instead of gallium.

The erosion of contact made from Ag-9Cd alloy with 0.1% thallium is 1.01 mg./kc.

Additional results are given in Table IV.

TABLE IV

| Composition | Wt. loss, mg./kc. | Conductivity, percent IACS | Hardness, RF | Voltage drop, mv. | Temp. rise, ° C. | Case depth |
|---|---|---|---|---|---|---|
| Ag-9Cd-0.1 Tl | 1.01 | 82.5 | 32 | 30–50 | 31–45 | 1.124 |
| Ag-9Cd-0.5 Tl | 1.04 | 82.0 | 33.6 | 30–50 | 30–40 | 1.142 |
| Ag-9Cd-1.0 Tl | 1.90 | 79.0 | 36.4 | 35–55 | 31–40 | 1.221 |
| Ag-9Cd-0.1 Ga | 1.37 | 82.0 | 42.8 | 25–55 | | 1.263 |
| Ag-9Cd 0.3 Ga | 1.77 | 78.0 | 44.0 | 25–55 | 25–45 | 1.295 |
| Standard Ag-9Cd | 1.65 | 75.0 | 45 | 30–50 | 32–55 | 1.138 |

Example VII

Silver and 9% cadmium and the amounts of tin as additive in Table V were melted and cast to the form of ingot. The ingot was then rolled to a slab of ⅛ inch of thickness. Slugs with the electrocontact shape of Example I were punched from the slab.

These slugs were oxidized at 800° C. for 96 hours in air. The microstructure of the oxidized slug (as shown in FIG. 8) displayed a much finer particle than that of the straight Ag-CdO material (FIG. 1). When the material with 0.1% additive was tested under the condition 215 v., 150 A.C. with a power factor of 45–55%, its arc erosion rate (weight loss) was 1.36 milligrams per kilocycle of operation (mg./kc.), while the arc erosion rate of the straight Ag-CdO material tested under the same condition was 1.65 mg./kc.

Additional results are shown in Table V.

TABLE V
Effect of additives on the Ag-CdO materials

| Alloy additives, percent | Estimate of relative average Ag-CdO particle | Erosion rate, mg./kc. | Case depth at 96 hr/. 800° C. | Conductivity, IACS percent |
|---|---|---|---|---|
| Basic | 1.0 | 1.65 | 1.138 | 75 |
| (a) Sn 2.0 | | 0.94 | 0.989 | 72 |
| (b) Sn 0.2 | | 1.43 | 1.150 | 80 |
| (c) Sn 0.1 | 0.5 | 1.36 | 1.211 | 83 |

We claim:

1. An alloy having high electrical conductivity comprising:
   cadmium in an amount from about 1 to about 30% weight;
   at least one additive selected from the group consisting of cerium, yttrium, and strontium, antimony, scandium, gallium and thallium, which reduces the arc erosion rate, in an amount of from 0.001 to 5% by weight; the remainder silver.

2. An alloy according to claim 1 in which also is contained tin in an amount of 0.001 to about 5% by weight.

3. An alloy according to claim 1 in which said cerium is added in an amount from 0.001 to 1.0%.

4. An alloy according to claim 1 wherein said additive is scandium in an amount from about 0.01 to 1.5% by weight.

5. An alloy according to claim 1 in which said antimony is added in an amount from 0.001 to 1.0%.

6. An alloy according to claim 1 in which said gallium is added in an amount from 0.001 to 0.5%.

7. An alloy according to claim 1 in which said thallium is added in an amount from 0.005 to 2%.

8. An alloy according to claim 1 in which strontium is added in an amount from 0.001 to 1.5%.

9. An alloy according to claim 1 in which yttrium is added in an amount from 0.001 to 1.5%.

10. An alloy according to claim 1 in which the cadmium content is not above about 25%.

11. An alloy according to claim 8 in which the strontium content is 0.01 to 1%.

12. An alloy according to claim 9 in which the yttrium content is 0.01 to 1%.

13. An alloy according to claim 7 in which the cadmium content is not above about 15%.

14. An alloy according to claim 3 in which the cerium content is from about 0.01 to about 0.2%.

15. An alloy according to claim 5 in which the antimony content is from about .01 to 0.5%.

16. An alloy according to claim 6 in which the gallium content is from about 0.01 to 0.3%.

17. An alloy according to claim 7 in which the thallium content is from about 0.01 to about 1%.

18. An electrical contact having high electrical conductivity comprising:
   cadmium in an amount from about 1 to about 30% by weight,
   at least one additive selected from the group consisting of cerium, yttrium, strontium, scandium, gallium, thallium and antimony, which reduces the arc erosion rate, in an amount of from 0.001 to 5% by weight, the remainder silver.

19. An electrical contact according to claim 18 which also contains tin in an amount from 0.001 to 5% by weight.

20. An electrical contact according to claim 18 wherein said additive is scandium in an amount from about 0.01 to 1.5% by weight.

21. An electrical contact according to claim 18 in which said additive is cerium in an amount from 0.001 to 1.0%.

22. An electrical contact according to claim 18 in which said antimony is added in an amount from 0.001 to 1.0%.

23. An electrical contact according to claim 18 in which said gallium is added in an amount from 0.001 to 0.5%.

24. An electrical contact according to claim 18 in which said thallium is added in an amount from 0.005 to 2%.

25. An electrical contact according to claim 18 in which strontium is added in an amount from 0.001 to 1.5%.

26. An electrical contact according to claim 18 in which yttrium is added in an amount from 0.001 to 1.5%.

27. An electrical contact according to claim 25 in which the strontium content is from 0.01 to 1%.

28. An electrical contact according to claim 26 in which the yttrium content is from 0.01 to 1%.

29. An electrical contact according to claim 18 in which the cadmium content is not above about 25%.

30. An electrical contact according to claim 18 in which the cadmium content is not above about 15%.

31. An electrical contact according to claim 25 in which the arc erosion rate is not above 1.3 mg./kc. under a duty cycle of 9/7 sec. off 1/7 seconds on under 215 volts, 150 amps A.C., power factor 45–55%.

32. An electrical contact according to claim 26 in which the arc erosion hate is not above 1.3 mg/kc. under a duty cycle of 9/7 sec. off 1/7 seconds on under 215 volts, 150 amps A.C., power factor 45–55%.

33. An electrical contact according to claim 27 in which the arc erosion rate is not above 1.5 mg./kc. under a duty cycle of 9/7 sec. off 1/7 seconds on under 215 volts, 150 amps A.C., power factor 45–55%.

34. An electrical contact according to claim 28 in which the arc erosion rate is not above 1.6 mg./kc. under a duty cycle of 9/7 sec. off 1/7 seconds on under 215 volts, 150 amps A.C., power factor 45–55%.

35. An electrical contact according to claim 29 in which the arc erosion rate is not above 1.4 mg./kc. under a duty cycle of 9/7 sec. off 1/7 seconds on under 215 volts, 150 amps A.C., power factor 45–55%.

36. An electrical contact according to claim 30 in which the arc erosion rate is not above 1.1 mg./kc. under a duty cycle of 9/7 sec. off 1/7 seconds on under 215 volts, 150 amps A.C., power factor 45–55%.

37. A method of reducing the oxidation time of silver-cadmium alloys comprising introducing into the alloy at least one additive selected from the group consisting of cerium, strontium, yttrium, gallium, thallium, scandium, and in an amount of 0.001 to 3% by weight.

38. A method according to claim 37 in which said additive also contains 0.001 to about 5% tin.

39. A method according to claim 37 in which scandium is added in an amount from about 0.01 to 1.5% by weight.

40. A method to claim 37 in which cerium is added in an amount from 0.001 to 0.5%.

41. A method according to claim 37 in which gallium is added in an amount from 0.001 to 1.0%.

42. A method according to claim 37 in which strontium is added in an amount from 0.001 to 1.0%.

43. A method according to claim 37 in which thallium is added in an amount from 0.5 to 2.0%.

44. A method according to claim 37 in which yttrium is added in an amount from 0.001 to 1.0%.

References Cited
UNITED STATES PATENTS

| | | | |
|---|---|---|---|
| 2,796,346 | 6/1957 | Stumbock | 75—173 R |
| 3,540,883 | 11/1970 | Comey | 75—173 R |
| 2,539,298 | 1/1951 | Doty et al. | 29—199 |
| 3,472,654 | 10/1969 | Comey et al. | 75—173 R |
| 3,607,244 | 9/1971 | Kabayama et al. | 75—173 R |
| 2,932,595 | 4/1960 | Pflumm | 148—11.5 |
| 3,477,845 | 11/1969 | Comey et al. | 75—173 R |

L. DEWAYNE RUTLEDGE, Primary Examiner

E. L. WEISE, Assistant Examiner

UNITED STATES PATENT OFFICE
CERTIFICATE OF CORRECTION

Patent No. 3,694,197　　　　　　　　　Dated September 26, 1972

Inventor(s) Edward J. Zdanuk, et. al.

It is certified that error appears in the above-identified patent and that said Letters Patent are hereby corrected as shown below:

Column 1, line 27, "," second occurrence should be -- . -- ; line 70, "0.02%" should read -- 0.2% -- . Column 3, line 8, after "1.50" there should be a -- . -- . Column 5, line 31, after "alternating" insert -- current -- ; line 32, "Examyle" should read -- Example -- . Column 6, line 6, cancel "percent", first occurrence. Column 7, line 31, "1.3" should read -- 1.5 -- ; line 35, "hate" should read -- rate -- .

Signed and sealed this 20th day of March 1973.

(SEAL)
Attest:

EDWARD M. FLETCHER, JR.　　　　　　　ROBERT GOTTSCHALK
Attesting Officer　　　　　　　　　　Commissioner of Patents